United States Patent [19]

Miyake

[11] Patent Number: 4,734,799
[45] Date of Patent: Mar. 29, 1988

[54] APPARATUS FOR TRACKING MAGNETIC HEAD ON ROTARY MAGNETIC RECORDING MEDIUM BY ENVELOPE DETECTION

[75] Inventor: Izumi Miyake, Kaisei, Japan

[73] Assignee: Fuji Photo Film Co., Ltd., Kanagawa, Japan

[21] Appl. No.: 750,267

[22] Filed: Jul. 1, 1985

[30] Foreign Application Priority Data

Jul. 2, 1984 [JP] Japan ................................ 59-135153

[51] Int. Cl.⁴ ............................................ G11B 21/10
[52] U.S. Cl. ........................................ 360/78; 369/43
[58] Field of Search ................. 358/342, 906, 909; 360/77, 78; 369/43, 50, 44, 45, 46

[56] References Cited

U.S. PATENT DOCUMENTS

| | | | |
|---|---|---|---|
| Re. 31,160 | 2/1983 | Kinjo | 360/77 X |
| 4,190,859 | 2/1980 | Kinjo | 360/77 X |
| 4,338,682 | 7/1982 | Hosaka et al. | 360/77 X |
| 4,544,872 | 10/1985 | Hirano et al. | 360/77 X |

FOREIGN PATENT DOCUMENTS

| | | |
|---|---|---|
| 2711920 | 3/1977 | Fed. Rep. of Germany . |
| 3424105 | 6/1984 | Fed. Rep. of Germany . |
| 2040501 | 8/1979 | United Kingdom . |
| 2112968 | 7/1982 | United Kingdom . |
| 2130400 | 10/1983 | United Kingdom . |

*Primary Examiner*—Robert L. Richardson
*Attorney, Agent, or Firm*—Birch, Stewart, Kolasch & Birch

[57] ABSTRACT

A tracking apparatus applicable to a rotatable magnetic recording medium which is provided with a plurality of discrete tracks thereon includes a head for sensing signals out of the tracks, a head transport mechanism for moving the head to a position on a desired one of the tracks, an envelope detector for detecting an envelope of signals sensed by the head, and a controller for performing tracking by controlling the head transport mechanism responsive to the detected envelope. A sync signal generator circuit is provided for producing a reference signal which is synchronous to the rotation of the recording medium. The controller controls the head transport mechanism and causes the envelope detector to detect an envelope, responsive to the reference signal.

5 Claims, 11 Drawing Figures

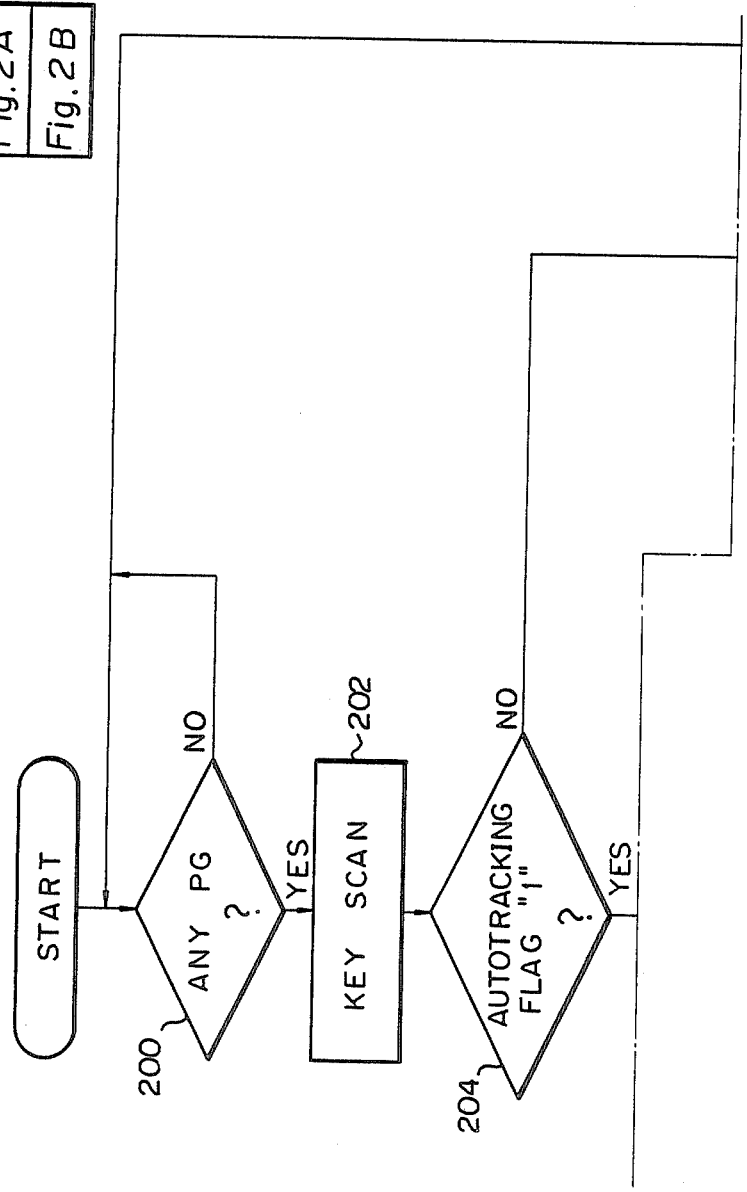

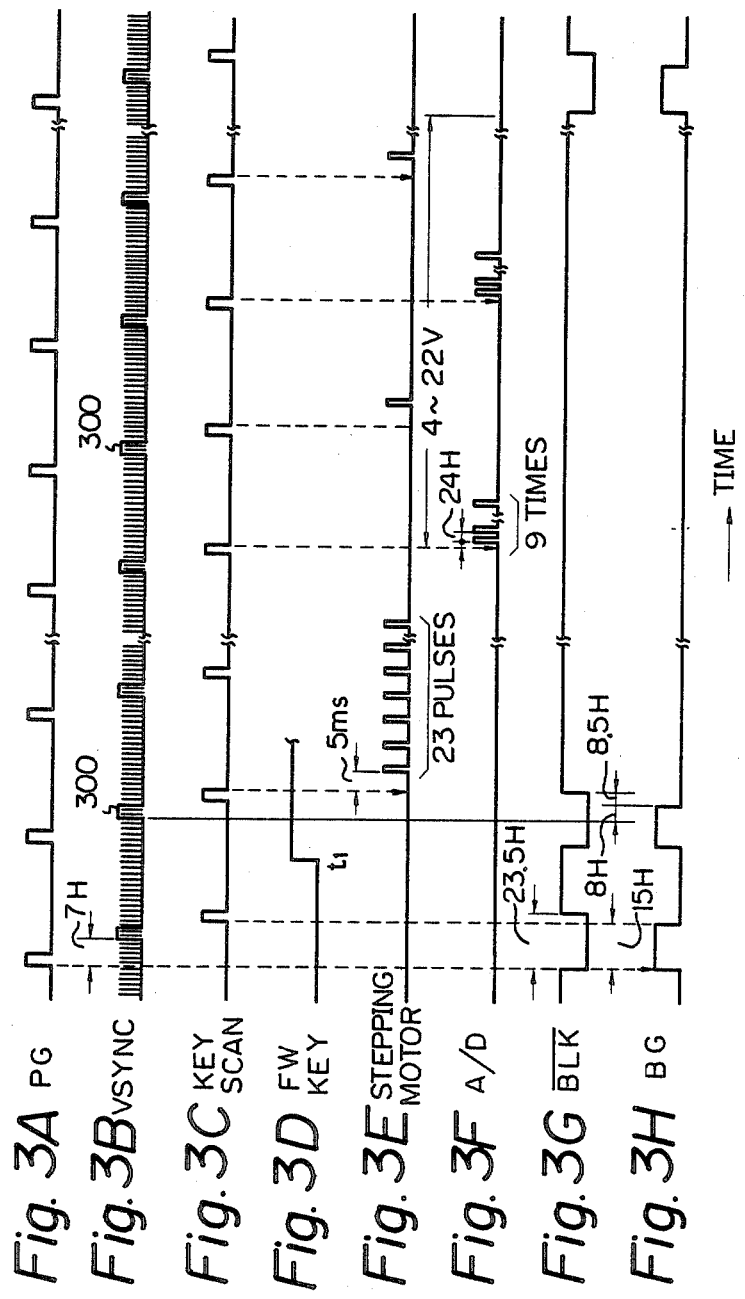

APPARATUS FOR TRACKING MAGNETIC HEAD ON ROTARY MAGNETIC RECORDING MEDIUM BY ENVELOPE DETECTION

BACKGROUND OF THE INVENTION

1. Field of the Invention

The present invention relates to a tracking apparatus for a rotary magnetic recording medium and, more particularly, to a tracking apparatus for tracking a rotary magnetic recording medium, such as a magnetic disk, magnetic drum, to reproduce information recorded thereon. Still more particularly, the present invention is concerned with a tracking apparatus of the type which reproduces information out of concentric tracks provided on a magnetic disk while effecting tracking servo.

2. Description of the Prior Art

One of the achievements in the realm of modern imaging art is an electronic still camera system which uses a combination of an imaging device, such as a solid state imaging device or an image pickup tube, and a recording unit using a magnetic disk, which is a relatively inexpensive and large-capacity recording medium. In this system, an image is taken purely electronically in the form of electrical signals representative of a still picture to be recorded on a magnetic disk while the disk is rotated. The picture may be reproduced in the form of a soft copy using a television system or in the form of a hard copy using a printer by way of example.

A problem with recording media, particularly magnetic disks, applicable to magnetic recording of the kind stated is that their anisotropy, eccentricity, thermal expansion and other undesirable factors are apt to result in tracking error. During reproduction, tracking error often causes a track next to a desired track to be scanned simultaneously with the desired one and, thereby, brings about crosstalk between video signals stored in the nearby tracks.

One approach heretofore proposed to solve the above problem is a system which records a tracking signal together with information in a recording medium under application of tracking servo and, in the event of reproduction, effects tracking servo utilizing the tracking signal. However, it is impractical to install in a small-size light-weight recording apparatus such as a camera a tracking servo mechanism which requires accurate control.

In light of the above, a guard band system or a frequency modulation (FM) azimuth system may be used for a recording scheme. The guard band or FM azimuth recording scheme is successful in preventing a playback head from scanning a track adjacent to a desired one or, if scanned, from picking up a signal from the adjacent track, thereby compensating for some degrees of tracking error during reproduction.

Another known approach is a so-called envelope peak detecting autotracking control system. The principle of this system is such that during recording a record head is transported by a stepping motor at predetermined track pitches without effecting tracking servo and, during playback, an envelope of signals read out of each track is detected so as to identify an optimum track based on the peak of the envelope, thereby effecting tracking servo.

As described above, in an envelope peak detecting autotracking system, tracking control occurs on the basis of envelope levels of signals recorded in a recording medium. When a magnetic head is located at or near the positive peak of envelope levels, it is determined to be in an optimum tracking position. Whether or not the head has reached a peak or near-peak position is determined by comparing envelope levels at at least two nearby head positions so as to see whether or not they have no substantial difference.

A rotary magnetic recording medium is usually provided with a plurality of tracks at predetermined intervals. A rotary magnetic recording medium for use with an electronic still camera system, for example, may comprise a disk which is as small as about 50 millimeters in diameter and provided with fifty tracks at track pitches of about 100 microns, i.e. tracks each being 50–60 microns wide and guard bands each being 50–40 microns wide. In a playback unit, such a disk is rotated at a constant speed of, for example, 3,600 revolutions per minute so that video signals are reproduced at a field or frame rate.

For accurate tracking, it is advantageous to detect envelope levels at several positions, which the head encounters while transported in the radial direction of the disk, compare the detected envelope levels, and repeat such a procedure. To accomplish this, setting up a reference for operating timings is the prerequisite. Usually, the reference is implemented utilizing sync signals which are contained in video signals to be reproduced from tracks, particularly vertical sync signals.

However, in a system which uses sync signals contained in video signals as a reference for operating timings, no effective reference signal is attainable while the head moves from a home position toward the first track or stays over an empty track which has no signal recorded thereon. In such a condition, it is impossible to accomplish effective movement of the head between tracks or effective tracking control.

SUMMARY OF THE INVENTION

It is therefore an object of the present invention to provide a tracking apparatus for a rotary magnetic recording medium which during playback allows a magnetic head to become on-track accurately in a desired track position on the recording medium.

A tracking apparatus for a rotary magnetic recording medium in accordance with the present invention is of the type including magnetic head means for sensing signals out of a plurality of tracks, each track being provided on the recording medium in such a locus that a beginning and an end of recording thereof coincide with each other in relative position, head transport means for transporting the head means to a desired one of the tracks, detector means for detecting an envelope of signals sensed out by the head means, and controller means for performing tracking by controlling the head transport means responsive to the detected envelope. The tracking apparatus comprises sync signal producing means for producing a reference signal which is synchronous to rotation of the recording medium. The controller means is responsive to the reference signal to control the head transport means and cause the detector means to detect an envelope.

It should be born in mind that the words "a plurality of tracks each being provided in such a locus that the beginning and end of recording coincide in relative position" which will appear herein imply those tracks which are each provided without changing the position of a record head relative to a rotary magnetic recording medium. Such tracks may be typified by a number of tracks on a magnetic disk which are concentric with respect to the axis of rotation of the disk, or a number of circumferentially extending tracks on a magnetic drum which are parallel to each other along the axis of the drum.

BRIEF DESCRIPTION OF THE DRAWINGS

The objects and features of the present invention will become more apparent from a consideration of the following detailed description taken in conjunction with the accompanying drawings in which:

FIGS. 2A and 2B, when combined as shown in FIG. 2, are flowcharts exemplarily representative of the operation of a controller included in the tracking apparatus of FIG. 1; and FIGS. 3A-3H are timing charts useful for understanding the operation of the controller.

DESCRIPTION OF THE PREFERRED EMBODIMENT

Figure 1:
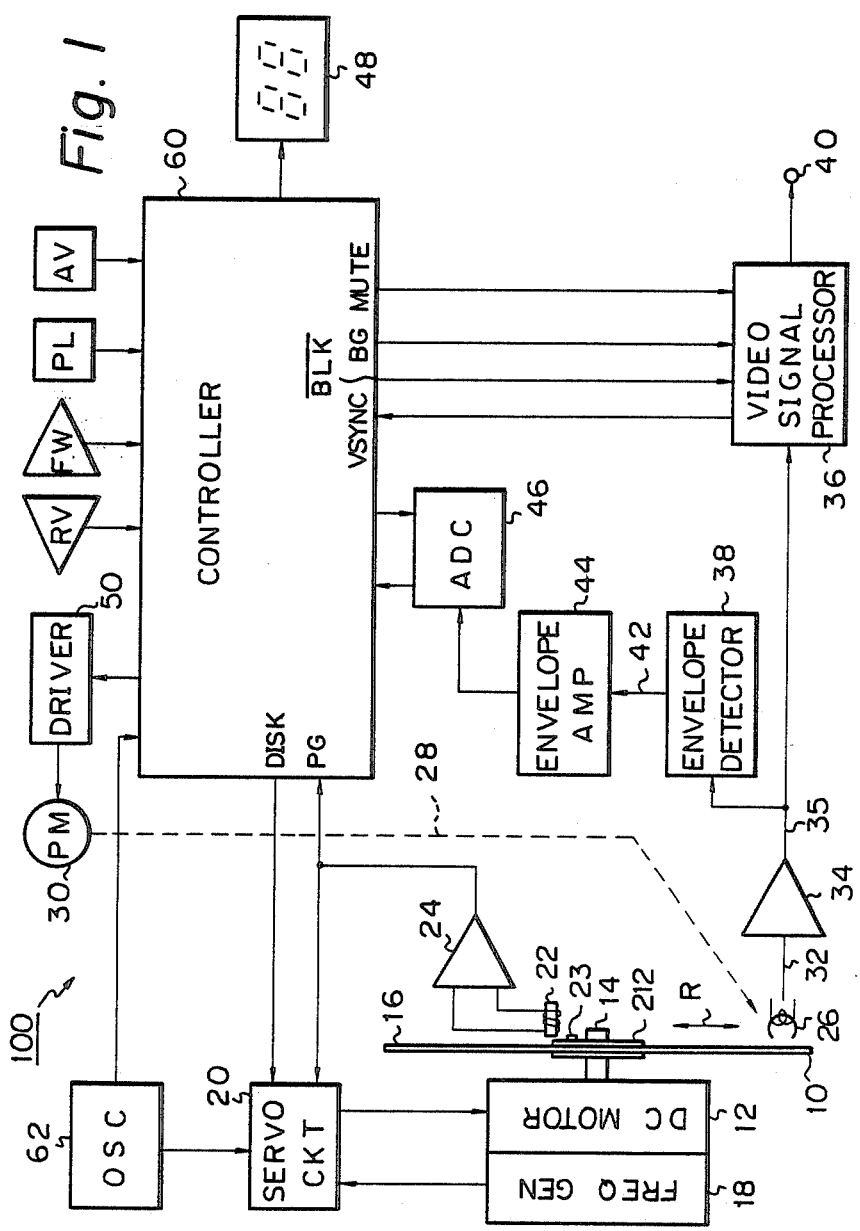
FIG. 1 is a schematic block diagram of a tracking apparatus for a rotary magnetic recording medium embodying the present invention.

Referring to FIG. 1 of the drawings, a video signal reproducing system including a tracking apparatus in accordance with the present invention is shown and generally designated by the reference numeral 100. As shown, the reproducing system 100 includes a dc motor 12 and a spindle 14 which is driven by the dc motor 12. A rotary recording medium such as a magnetic disk 10 is removably loaded on the spindle 14. In this particular embodiment, the recording medium 10 comprises a magnetic disk having a sheet of magnetic recording material, which is about 50 milimeters in diameter, and accommodating, for example, fifty concentric tracks on its recording surface 16 at the pitches of, for example, about 100 microns. Signals which may be recorded in the tracks on the disk 10 are, in the illustrative embodiment, video signals as exemplified by color video signals whose luminance, chrominance and synchronizing signals are FM modulated. The video signals may be recorded on the tracks by raster scanning such that a field video signal which constitutes one complete field of picture is assigned to one track.

The dc motor 12 is provided with a frequency generator 18 adapted to generate an ac frequency signal. Powered by a servo circuit 20, the dc motor 12 is servo-controlled to drive the disk 10 at a predetermined constant speed such as 3,600 revolutions per minute. A control unit, or controller, 60 which governs the operation of the whole arrangement is interconnected to the servo circuit 20 so that the latter controls the start and stop of rotation of the disk 10 responsive to a signal DISK.

A phase generator 22 is located in a predetermined position adjacent to the recording surface 16 of the disk 10 and interconnected via an amplifier 24 to the servo circuit 20 and the controller 60. Every time the phase generator 22 senses a timing mark 23 which is provided in a predetermined position on a core 212, it generates a timing pulse PG.

Disposed above the recording surface 16 of the disk 10 is a magnetic head, or transducer, 26 which is supported by a support mechanism 28. As schematically represented by the phantom line in the drawing, the support mechanism 28 is driven by a stepping motor (PM) 30 to move the head 26 radially along the recording surface 16 in any of opposite directions as indicated by a double-headed arrow R, so that a desired track on the recording surface 16 may be selected.

While the head 26 may be of the type having a magnetic recording function, it in the illustrative embodiment serves the playback function, that is, it senses a video signal out of a track provided on the recording surface 16 and then transforms it into an associated electric signal. Since the disk 10 in this particular embodiment rotates at a constant speed of 3,600 revolutions per minute as earlier described, one track of video signal, or one field of FM modulated video signal, is reproduced by the head 26 for each full rotation of the disk 10, or 1/60 second. The reproduced video signal is demodulated in a format which is compatible with a standard color television format such as the NTSC (National Television System Committee).

The disk 10 which is advantageously applicable to the illustrative embodiment of the present invention is of the kind in which a video signal is recorded by a recording apparatus such that a vertical sync signal VSYNC appears with a phase delay of a predetermined period of time, such as 7Hs (horizontal scanning periods), with respect to the timing mark which is adapted for the generation of timing pulses PG.

The output 32 of the head 26 is routed through a preamplifier 34 to a video signal processing circuit 36 and an envelope detection circuit 38. The video signal processing circuit, or processor 36, processes a video signal sensed by the head 26 and then applies the processed video signal to an output terminal 40 of the system in the form of, for example, an NTSC format composite color video signal. At the same time, the processor 36 separates vertical sync signals from the composite color video signal to apply them to the controller 60. Meanwhile, when supplied with a signal MUTE from the controller 60, the processor 36 mutes the video signal over an effective horizontal scanning period. It will be noted, however, that the function of converting a video signal from the head 26 to a standard television signal format assigned to the processor 36 as described is merely an optional feature. Alternatively, the processor 36 may function to separate sync signals from video signals sensed by the head 26 to simply feed the sync signals to the output terminal 40 under the control of the controller 60.

The envelope detection circuit, or detector, 38 serves to detect the envelope of FM modulated video signals stored in each track on the recording surface 16 and then develop at its output 42 a voltage complementary to the detected envelope. The output 42 of the envelope detector 38 is interconnected to an analog-to-digital converter (ADC) 46 by way of an envelope amplifier 44. In this particular embodiment, the ADC 46 has 256 quantizing levels, any one of which is produced in the form of eight-bit data to the controller 60 in response to a request from the latter.

As described later in detail, the controller 60 supervises the operations of the whole system as instructed by operator's manipulation and may advantageously be implemented by a microprocessor system.

In the illustrative embodiment, there are provided a play key PL for activating and deactivating the system, a forward key FW for causing the head 26 to be transported forwardly with respect to serial numbers which are assigned to the tracks (e.g. from the outermost track to the innermost track), and a reverse key RV for causing the reverse direction transportation of head 26.

These keys PL, FW and RV are interconnected to the controller 60. A number designated by the key FW or RV appears on a display 48 which is interconnected to the controller 60 and may comprise light emitting diodes or a CRT display, for example. The display 48 may also be furnished with a function of producing audible alarms and others, if desired.

The stepping motor 30 in this particular embodiment comprises a four-phase drive pulse-operated motor which rotates about 18 degrees responsive to one drive pulse and, therefore, 360 degrees responsive to twenty pulses in total. The head support structure 28 is constructed to transport the head 26 about 4.2 microns in one of the directions R responsive to one pulse applied to the stepping motor 30, that is, to move the head 26 about 100 microns in response to twenty-four consecutive pulses.

The drive pulses are applied to the stepping motor 30 from a driver 50 which comprises a current amplifier. The driver 50 generates pulses for driving coil windings of the stepping motor 30 according to a particular drive pattern which is specified by the controller 60.

The controller 60 and servo circuit 20 respond each to a reference clock which is generated by a reference generator (OSC) 62. In the illustrative embodiment, the servo circuit 20 is supplied with a 60 Hz reference signal which is equal to the field frequency of video signals to be recorded in the disk 10 by raster scanning, while the controller 60 is supplied with a high-frequency clock such as a 3.58 MHz clock.

Figure 2B:
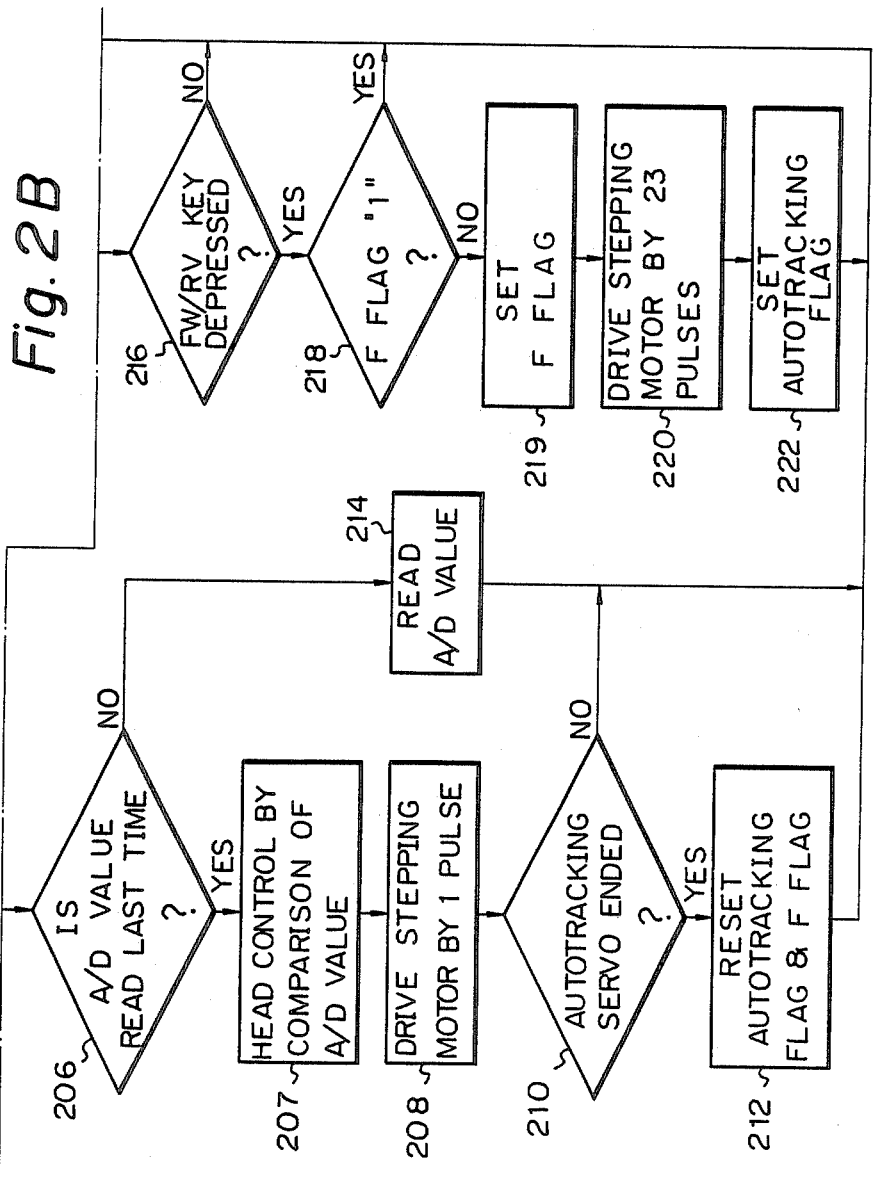

Referring to FIGS. 2A and 2B flowcharts demonstrating an example of transportation of the head 26 over the tracks and of tracking control which are executed by the controller 60 are shown. The reference for the operation shown in FIG. 2 is provided by a key scan signal, FIG. 3C.

In an initial stage of operation of the reproducing system 100, the key scan signal is generated at intervals, which may advantageously be 1/59 second, which is slightly longer than 1/60 second of the vertical scanning period and formed by counting the reference clock which is applied from the reference oscillator 62 to the controller 60, i.e. 1V (vertical scanning period). However, as the system is stabilized after the activation of the system 100, the key scan signal is generated at a predetermining timing based on the previously mentioned signal PG.

When the disk 10 begins to rotate driven by the dc motor 12, the phase generator 22 generates a phase generator signal, or pulse, PG every time the timing mark on the core 212 moves past the phase generator 22, the signal PG being routed to the controller 60 and the servo circuit 20. The signal PG is shown in FIG. 3A as being in a substantially stabilized condition. In the case of the disk 10 which has stored one field of video signal on one track, the period of the signal PG is 1V.

As the system reaches a steady condition, the controller 60 generates a vertical blanking signal $\overline{BLK}$ as shown in FIG. 3G and a color burst gate signal BG as shown in FIG. 3H each at a predetermined timing which is based on the signal PG. The signals $\overline{BLK}$ and BG are delivered to the video signal processor 36.

As soon as the head 26 which is driven by the stepping motor 30 through the mechanism 28 is brought to a position over a certain track on the disk 10, it picks up video signals as shown in FIG. 3B. The video signals stored in the disk 10 contain vertical sync signals VSYNC 300 at periods of 1V. The video signals have been recorded such that in a steady condition each vertical sync signal VSYNC 300 is delayed in phase by about 7Hs relative to the signal PG.

The operation flow shown in FIG. 2 is triggered responsive to a signal PG. So long as the condition remains stable, the signal PG appears at every period of 1V and, hence, the illustrated flow is triggered in each 1V. Upon generation of a signal PG, the controller 60 produces a key scan signal (step 202, and FIG. 3C). If an envelope peak detecting autotracking flag which will be described is not set then (204), the controller 60 scans the respective keys (216) to check their statuses.

Assuming that the FW key is depressed at a time $t_1$ while the head 26 is located over a certain track, such a state is drawn into the controller 60 timed to a key scan signal which appears for the first time after the time $t_1$. In the illustrative embodiment, since an F flag which will appear later has not yet been set (218), the controller 60 sets it (219) and then causes the driver 50 to drive the stepping motor 30 forwardly by twenty-three pulses. As a result, the head 26 is transported about 96 microns (220). By the about 96 microns transportation, the head 26 is moved forwardly from one track to another which next to that track so that, in a normal condition, it will become on-track to detect an envelope value which is higher than a predetermined value. The same events will naturally occur but in the opposite sequence if the key RV has been depressed. This manner of drive proceeds at a timing as shown in FIG. 3E.

When the transportation is completed, the head 26, if the condition is normal, will have been settled over the adjacent track and, therefore, the controller 60 sets the autotracking flag (222). The F flag previously mentioned shows that the key FW or RV has been depressed to cause a tracking control associated therewith.

After the transportation, the controller 60 responds to a signal PG by producing a key scan signal (202) and, because the autotracking flag has already been set (204), the flow advances to a decision box 206. Since the controller 60 did not read a digital version of the analog video signal from the ADC 46 last time, it reads a digital output of the ADC 46 this time (214).

As previously mentioned, a digital output of the ADC 46 represents the envelope of video signals stored in a track of the disk 10. In this particular embodiment, as shown in FIG. 3F, an envelope is read, or sampled, a plurality of times such as nine times for each head position, and a weighted mean value of the sampled values is used as an envelope level at that head position. This eliminates mistracking due to scattering of envelope levels which might result from eccentricity of the disk 10 or other causes.

Upon generation of another signal PG, the control advances to a decision box 206 responsive to the resulting key scan signal. This time, since the controller 60 has read a digital output of the ADC 46, it performs a step 208 by way of a step 207 so that the stepping motor 30 is driven by another pulse in a direction which has been controlled at the step 207.

At the step 207, the controller 60 compares the two envelope levels which it read in consecutively and, then, designates a subroutine programed for the control over the direction of movement of the head 26. The operation at the step 207 will not be described in detail. Briefly, when an envelope level higher than a predetermined value is not detected at a head position which has been reached upon transportation of the head 26 from one track to the next, the controller 60 regards that track non-recorded and in turn searches another track next to that track. If no envelope level higher than the predetermined value has been detected at the two consecutive tracks, the controller 60 returns the head 26 to the last recorded track. Meanwhile, when any significant difference has been found between the two envelope levels, the controller 60 controls the movement of the head 26 such that the latter moves toward a position where the envelope level is higher. As soon as the significant difference between two envelope levels becomes zero, the controller 60 moves the head 26 a multiplicity of times while changing the direction of movement so as to confirm that no significant difference develops between the discrete envelope values and, then, the controller 60 ends the autotracking servo.

Referring again to FIG. 2, if the autotracking servo has not yet been ended, that is, if the head 26 has not yet been settled at a position at or near the peak of the envelope levels (210), the controller 60 repeatedly executes the loop made up of the steps 200, 202, 204, 206 and 214 and the loop made up of the steps 200, 202, 204, 206, 207, 208 and 210, i.e. repeatedly reading the digital output of the ADC 46 and transporting the head 26 by one pulse each time. The controller 60 in this manner continues with the autotracking control by comparing the envelope levels.

As the system is converged by the above sequence of events, the controller 60 ends the autotracking control (210) to reset the autotracking flag and F flag (212) to prepare for the next keying.

When the head 26 has been settled exactly on a desired track, video signals in an adequate condition are delivered from the head 26 to the video signal processor 36, FIG. 3B. It follows that the processor 36 is operated referencing vertical sync pulses 300 or other sync signals which are contained in the video signals.

As described above, in this particular embodiment, the time reference for the operation of the controller 60 is provided by the key scan signals. Before the timing signals PG appear steadily, the key scan signals are produced based on the reference clock which is produced from the reference generator 62 and, after steady generation of the signals PG is set up, based on the signals PG. It will thus be seen that the reference for the head transportation and envelope detection with respect to timing is provided not by the sync signals contained in video signals but by the signals PG output from the phase generator 22.

Therefore, reference signals essential for the operation of the system are surely provided even when the head 26 is in transportation from the home position toward the first track, when it is above a track which stores no signals, or when sync signals expected to exist in video signals have dropped out. Such effectively promotes movement of the head 26 between discrete tracks as well as tracking control.

In summary, it will be seen that the present invention provides a tracking apparatus for a rotary magnetic recording medium which allows a magnetic head to surely settle in a position on a desired track for a playback operation. This advantage is derived from the principle particular to the present invention that the time reference essential for the operations of the device such as head transportation and envelope detection is set up using reference signals which are synchronous to the rotation of the disk in a steady condition. Specifically, even when the head is in movement from its home position toward the first track, when it is in a position above a track which stores no signals, or when sync signals which should be contained in video signals have dropped out, the tracking apparatus of the present invention attains an effective reference signal to thereby effectively perform head transportation between tracks and tracking control.

Various modifications will become possible for those skilled in the art after receiving the teachings of the present disclosure without departing from the scope thereof.

What is claimed is:

1. A tracking apparatus for a rotary magnetic recording medium on which a plurality of tracks are recorded, each track defining an endless loop, comprising:
   magnetic head means for sensing signals recorded on one of the plurality of tracks;
   head transport means for transporting said magnetic head means across the rotary magnetic recording medium;
   detector means for detecting an envelope of the signals sensed by said magnetic head means;
   control means for controlling said head transport means to cause said magnetic head means to be transported onto desired ones of the plurality of tracks on the basis of the detected envelope; and
   sync signal producing means for producing a reference signal which is synchronous with rotation of the recording medium;
   said control means being responsive to the reference signal to receive the detected envelope and effect tracking of said magnetic head means by said head transport means.

2. A tracking apparatus in accordance with claim 1 wherein
   the recording medium is provided with a timing mark,
   said sync signal producing means sensing the timing mark to produce the reference signal,
   said control means, at a predetermined timing relative to the reference signal, receiving the envelope detected and effecting tracking of said magnetic head by said head transport means.

3. A tracking apparatus in accordance with claim 2, wherein said rotary recording medium is a magnetic recording disk having a track on which recorded is a field of the video signals including luminance, chrominance and synchronizing signals formed in a raster scanning fashion.

4. A tracking apparatus in accordance with claim 3, wherein the synchronizing signal includes a vertical synchronous signal recorded on the disk with a delay of 7 Hs of the raster scanning with respect to the reference signal with allowance of ±5 Hs thereto, the predetermined timing being set with a delay of 15 Hs with respect to the reference signal.

5. A tracking apparatus in accordance with claim 3, wherein the video signals are recorded on the disk in frequency modulation, said apparatus further comprising reproducing means for receiving the video signals sensed by said head means to demodulate and develop the video signals.

* * * * *